United States Patent [19]

Ryham

[11] Patent Number: 5,186,726
[45] Date of Patent: Feb. 16, 1993

[54] SUSPENSION DEAERATING PROCESS

[75] Inventor: Rolf Ryham, Princeton, N.J.

[73] Assignee: Ahlstromforetagen Swenska, Norrkoping, Sweden

[21] Appl. No.: 522,223

[22] Filed: May 11, 1990

[51] Int. Cl.$^5$ .............................................. B01D 19/00
[52] U.S. Cl. .................................... 55/32; 55/46; 55/48; 55/49; 55/55; 159/2.1; 159/47.1; 159/DIG. 31; 162/46; 162/53; 203/42; 203/88; 210/634
[58] Field of Search .................. 55/32, 46, 48, 49, 50, 55/55, 195; 162/46, 53; 159/DIG. 31, 47.1, 2.1; 202/176, 185.2; 203/42, 88; 210/634

[56] References Cited

U.S. PATENT DOCUMENTS

| | | | |
|---|---|---|---|
| 1,401,101 | 12/1921 | Ehrhart | 55/46 |
| 1,758,566 | 5/1930 | Elliott | 55/50 |
| 3,206,917 | 9/1965 | Kaiser et al. | 55/41 |
| 4,219,340 | 8/1980 | Kaiser | 55/55 |
| 4,261,707 | 4/1981 | Bradshaw | 55/50 |
| 4,295,864 | 10/1981 | Rudolph et al. | 55/50 |
| 4,402,795 | 9/1983 | Erickson | 203/42 |
| 4,670,027 | 6/1987 | Becker et al. | 55/49 |
| 4,696,718 | 9/1987 | Lasater | 55/195 |
| 4,754,613 | 7/1988 | Brito | 55/55 |

Primary Examiner—Wilbur Bascomb, Jr.
Attorney, Agent, or Firm—Cohen, Pontani, Lieberman, Pavane

[57] ABSTRACT

A method and apparatus for deaerating a suspension of solids in a liquid such as, for instance, papermaking stock. The suspension is flashed in a vacuum tank connected to a condenser. The vapor released when the suspension is flash cooled in the tank is condensed into an absorption liquid having a higher temperature but a lower vapor pressure than that of the released vapor on a heat exchange surface of the condenser. The flash cooled suspension is used as the cooling medium in the condenser. The diluted absorption liquid is regenerated in an evaporator and recirculated to the condenser. The vapor released in the evaporator can be condensed to heat the suspension further or for other suitable heating purposes.

6 Claims, 1 Drawing Sheet

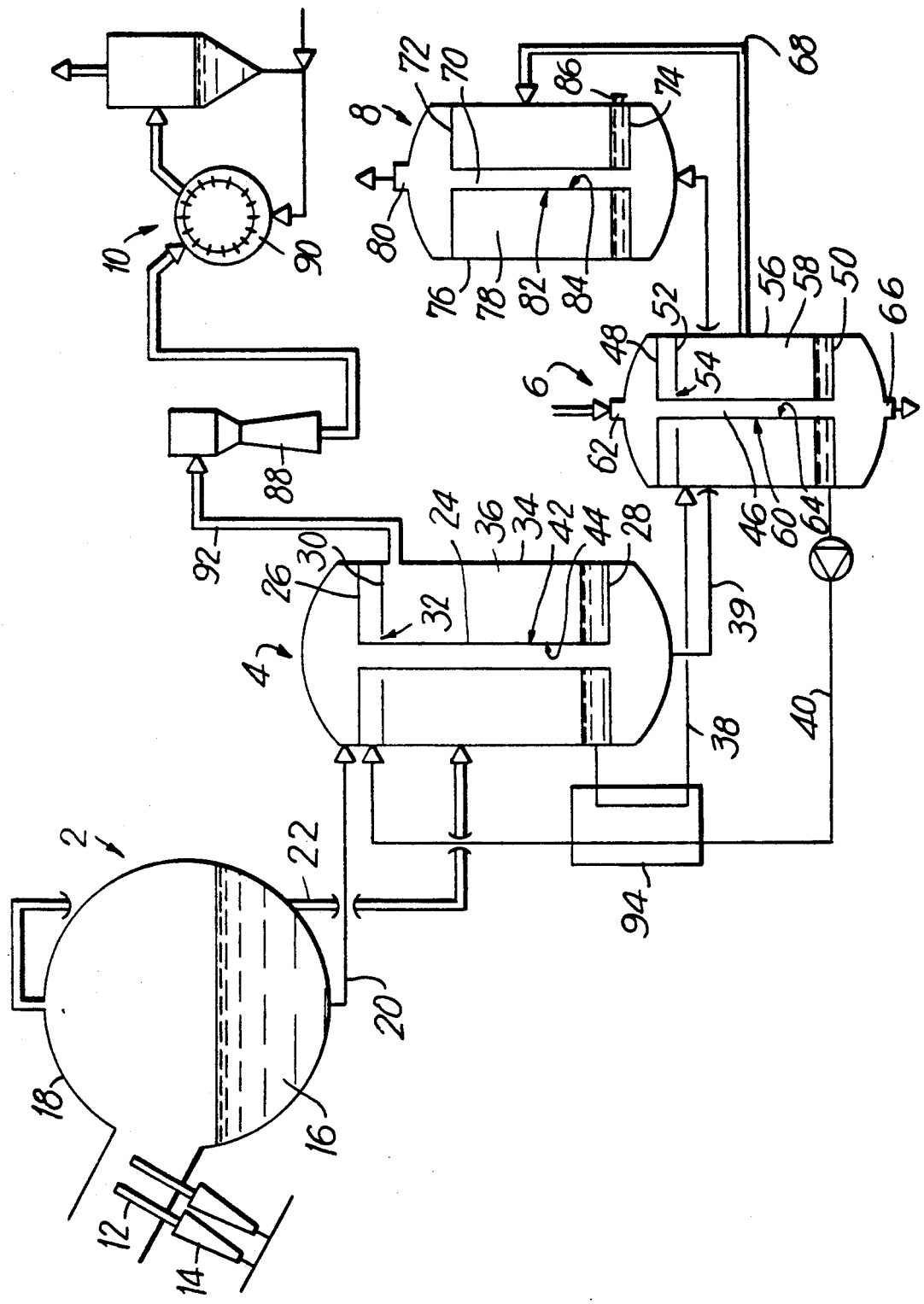

5,186,726

SUSPENSION DEAERATING PROCESS

FIELD OF THE INVENTION

The present invention relates to a process and an apparatus for deaerating a suspension of solids in a liquid and, more particularly, to a fiber suspension such as paper machine stock.

BACKGROUND AND SUMMARY OF THE INVENTION

Paper machine stock contains in addition to water and fibers also necessary additives and depending on the treatment of the stock and its grade, air and other gases. The entrained air may disturb the web forming process and affect the quality of the finished product. In general, the paper stock is, therefore, deaerated before it is supplied to the headbox of the paper machine. The most common deaerating method is vacuum deaeration by allowing the paper stock to expand in a tank connected to a condenser and a vacuum pump. In the tank, a reduced pressure is maintained which approximately corresponds to the boiling pressure of water at the temperature prevailing within the tank. The temperature in the tank, in turn, depends on the cooling water temperature of the condenser. In geographical areas with high ambient water temperatures, such as 20°-26° C., this represents a rather severe restriction on the operation of the system. Methods and apparatus for accomplishing deaeration of papermaking stock are disclosed, for instance, in U.S. Pat. Nos. 3,206,917 and 4,443,232.

It is further known that the water vapor pressure above concentrated water-salt solutions of, for example, calcium chloride, lithium chloride, lithium bromide or the like and/or mixtures thereof is lower than that of pure water at a corresponding temperature and that these solutions can therefore be used as water-absorption liquids.

The present invention utilizes the low vapor pressure above a concentrated salt solution for allowing a saturated vapor to be absorbed in a salt solution having a higher temperature than the absorbed vapor.

According to one aspect of the invention, paper machine stock is deaerated by causing it to expand in a flash tank and condensing the water vapor produced thereby into a water-absorbing liquid on a cooled heat exchange surface. Preferably, the flash cooled paper machine stock is used as a cooling medium in the condenser.

Accordingly, one advantage of the present system over the conventional system is that the cooled paper stock can be used as cooling medium due to the "heat pumping" effect when the water vapor is absorbed into the hygroscopic solution. Normally, cooling water having a temperature of 25° C. would be sufficient for the flash cooling of paper stock having a temperature of 44° C. (44°-60° C.), but the heat generated would be lost to a lower level by heating the 25° C. cooling water to, e.g. 30° C.

If the present system is used for producing extremely low pressures a typical example would be that the suspension is flash cooled from 30° C. to 25° and the vapor is condensed into the hygroscopic solution at a temperature of 45° C. and the heat of condensation is removed by constantly cooling the condenser using cooling water of, e.g. 25° C. being heated to 30° C. This would, of course, be impossible to perform with a conventional system using normal surface condensers.

The invention will also permit the complete deaeration of suspensions of solids in a liquid at a vapor pressure much lower than that present when normal cooling water is used. Additionally, the heat which is released when the suspension is flash cooled is preferably transferred back to the suspension when it is used as a cooling medium in the condenser, thus recovering substantially all of the heat.

The absorption liquid diluted by the vapor condensed into it is thereafter regenerated in an evaporator and recirculated back to the condenser.

BRIEF DESCRIPTION OF THE DRAWING

The following detailed description of a preferred embodiment of the present invention is given with reference to the accompanying drawing which shows a schematic flow diagram of an deaeration system for papermaking stock.

DETAILED DESCRIPTION OF A PRESENTLY PREFERRED EMBODIMENT

As shown in the drawing, the deaeration system comprises a deaerator 2, a condenser 4, an evaporator 6, a condenser 8 and evacuating means 10. Feed stock is admitted to the deaerator through a plurality of spray pipes 12 mounted on hydrocyclone cleaners 14 and exposed to a pressure well below the atmospheric pressure, for example, by a suitable vacuum pump 10 thereby removing air from the stock and producing deaerated stock which is collected as a pond 16 in the lower portion of a tank 18. The deaerated stock is passed from deaerator 2 to condenser 4 through a conduit 20. Air removed from the stock and vapor produced by the evaporation of water under the vacuum therefrom and maintained in the tank is passed from the deaerator to the condenser through a conduit 22.

The condenser 4 may be either of the tube or plate type. The condenser shown in the drawing comprises a plurality of vertical heat exchange tubes 24 (only one is shown). The ends of the tubes are attached to an upper tube plate 26 and a lower tube plate 28. A plate 30 disposed below the upper tube plate forms an annular gap 32 around each tube. The tubes and the tube plates are enclosed in a casing 34. The plate 30 and the lower tube plate 28 form, together with the wall of the casing, an enclosed space 36. Conduit 20 is connected to the upper end of the casing. Conduit 22 is connected to the upper portion of the enclosed space 36. A conduit 38 connects the lower end of the enclosed space to evaporator 6. A conduit 40 connects the space between the upper tube plate 26 and plate 30 to the evaporator.

Concentrated absorption liquid supplied through conduit 40 is introduced into the space between the upper tube plate 26 and plate 30 and flows down through the gaps 32 so that a thin liquid film of absorption liquid is formed on the outer surface 42 of the tubes 24.

By introducing the water vapor released by expansion in the tank 18 through conduit 22 into the enclosed space 36 of the condenser, the water vapor is brought into direct contact with the absorption liquid flowing down along the outer surface of the tubes 24 as described.

The water vapor condenses on the outer surface of the tubes and is removed therefrom as condensate along with the absorption liquid through conduit 38. As long as the temperature of the absorption liquid and the concentration thereof are such that the water vapor pressure above the liquid is lower than that of the water vapor to be absorbed therein, the water vapor will be absorbed by the absorption liquid. The heat released by condensation of water vapor will be taken up by the cooling fluid flowing along the inner surface 44 of tubes 24 and by the absorption liquid which will be heated up to its point of equilibrium. The absorption liquid diluted by condensed water vapor is passed to the evaporator 6 through conduit 38. The stock which cools in tank 18 as a result of the sudden pressure drop is used as the cooling medium in the condenser 4 and will thereby be heated up again to its original temperature. The stock is introduced into the upper end of casing 34 and discharged from the lower end of the casing to be passed to condenser 8 through a conduit 39.

The evaporator 6 is preferably of falling film type like the condenser 4. The evaporator shown in the drawing comprises a plurality of vertical heat exchange elements or tubes 46 (only one is shown). The ends of the tubes are attached to an upper tube plate 48 and a lower tube plate 50. A plate 52 disposed below upper tube plate 48 forms an annular gap 54 around each tube. The tubes and the tube plates are enclosed in a casing 56. The plate 52 and the lower tube plate 40 form, together with the wall of the casing, an enclosed space 58.

The diluted absorption liquid is passed from the condenser 4 to the evaporator 6 through conduit 38 and is introduced into the space between the upper tube plate 48 and plate 52. The liquid then flows through the gaps 54 in form of an even and continuous liquid film along the outer surface 60 of the tubes 46. A heating medium such as low pressure steam (indicated as arrow) is introduced into the top of the evaporator casing through an inlet 62 and flows through the tubes along inner surface 64 thereof. The absorption liquid flowing down on the outer surface 60 will be heated to its boiling point by indirect heat exchange with the steam, whereupon water will evaporate from the absorption liquid. The concentrated absorption liquid collected at the bottom 50 of the enclosed space 58 is withdrawn from the evaporator and passed to the condenser 4 through conduit 40. An outlet 66 for the heating medium is provided in the bottom of the evaporator casing 56. As is further described below, the water vapor generated by the evaporation of the absorption liquid is withdrawn from the enclosed space 58 through a conduit 68 connected to the condenser 8 to be condensed therein and, at the same time, serving as a heating medium for the stock which has passed through condenser 4 and through conduit 39 to condenser 8.

The condenser 8 shown in the drawing comprises a plurality of vertical heat exchange tubes 70 (only one of which is shown). The ends of the tubes are attached to an upper tube plate 72 and a lower tube plate 74. The tubes and the tube plates are enclosed in a casing 76. The tube plates form, together with the wall of the casing, an enclosed space 78. Conduit 68 from the evaporator is connected to the enclosed space. Conduit 39 from condenser 4 is connected to the lower end of the casing. An outlet 80 for the stock is provided in the upper end of the casing. Although condenser 8 as shown is an indirect condenser, it is understood that a condenser of the direct type such as a spray condenser could also be utilized.

The water vapor generated in evaporator 6 is introduced into the enclosed space 78 of the condenser 8 in which the water vapor will be condensed on the outer surface 82 of the tubes by heat transfer to the stock present on the inner surface 84 of the tubes 70. The condensate is removed through an outlet 86 from the enclosed space. The stock heated by the latent heat of condensing is removed through outlet 80.

The evacuating means 10 preferably comprises an air (see arrow) propelled ejector 88 and a liquid seal vacuum pump 90 connected through a conduit 92 to the enclosed space 36 of condenser 4 so as to maintain the low vacuum required there and remove air from the condenser.

The diluted absorption liquid from condenser 4 is preferably heated in a heat exchanger 94 by the concentrated absorption liquid from evaporator 4.

EXAMPLE

Paper stock having a temperature of 44° C. is fed into a deaeration tank at a pressure of 74 mbar. The vapor released when the stock is flash cooled to a temperature of 40° C. is condensed into a hygroscopic water solution of 70° C. on the surface of heat exchange elements of a first condenser in which the stock from the deaeration tank is used as the cooling medium. The latent heat of condensing will heat up the solution to a temperature of 60° C. The stock will heat up to its original temperature of 44° C.

The absorption liquid diluted by condensate formed by the vapor water is regenerated by evaporation of water in an evaporator heated by steam having a temperature of 120° C. The concentrated absorption liquid is recirculated to the condenser. The diluted absorption liquid discharged from the condenser at a temperature of 60° C. will be heated in a heat exchanger to a temperature of 90° C. by the concentrated liquor discharged from the evaporator at a temperature of 100° C., whereby the temperature drops to 70° C.

In a second condenser, the stock is heated to 48° C. by the water vapor having a temperature of 80° C., produced when concentrating the absorption liquid.

It should be understood that the preferred embodiment and example described above is for illustrative purposes only and is not to be construed as limiting the scope of this invention which is properly delineated only in the appended claims. While the invention has been herein shown and described as what is presently perceived to be the most practical and preferred embodiment thereof, it will be apparent to those having ordinary skill in the art, that many modifications may be made thereof within the scope of the invention.

What is claimed is:

1. A process for deaerating a suspension of solids in a liquid, comprising the steps of:
    a) expanding said suspension at a reduced pressure so as to remove air from said suspension and obtain vapor and cooled suspension;
    b) condensing and absorbing said vapor in an absorption liquid having a lower vapor pressure than said vapor at a corresponding temperature by indirect heat exchange with a cooling fluid thereby forming diluted absorption liquid;
    c) utilizing as a cooling fluid in step b) the cooled suspension from step a);
    d) heating the diluted absorption liquid formed in step b) to the boiling point thereof by indirect heat exchange with a heating fluid to form vapor and concentrated absorption liquid; and e) recirculating said concentrated absorption liquid to step b).

2. The process in accordance with claim 1, further comprising the step of:

condensing said vapor produced by heating the absorption liquid in step d) by heat exchange with said suspension used as the cooling fluid in step b).

3. The process in accordance with claim 1, further comprising the step of:

heating said diluted absorption liquid resulting from step b) prior to step d) by indirect heat exchange with said concentrated absorption liquid of step d).

4. The process in accordance with claim 1, wherein said suspension is paper machine stock.

5. The process in accordance with claim 1, wherein said absorption liquid is an aqueous solution comprising potassium acetate, sodium acetate, potassium carbonate, calcium chloride, lithium chloride, lithium bromide or mixtures thereof.

6. The process in accordance with claim 2, wherein said vapor produced in step d) is condensed by indirect heat exchange.

* * * * *